United States Patent
Hayami

(10) Patent No.: US 8,966,472 B2
(45) Date of Patent: Feb. 24, 2015

(54) IMAGE FORMING APPARATUS, METHOD OF PREINSTALLING APPLICATION, AND NON-TRANSITORY COMPUTER-READABLE MEDIUM

(71) Applicant: Canon Kabushiki Kaisha, Tokyo (JP)

(72) Inventor: Yoshikazu Hayami, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/963,213

(22) Filed: Aug. 9, 2013

(65) Prior Publication Data

US 2014/0082608 A1 Mar. 20, 2014

(30) Foreign Application Priority Data

Sep. 18, 2012 (JP) ................................. 2012-205035

(51) Int. Cl.
 G06F 9/445 (2006.01)
 G06F 21/00 (2013.01)
 G06F 13/12 (2006.01)
 H04N 1/00 (2006.01)

(52) U.S. Cl.
 CPC *G06F 8/61* (2013.01); *G06F 13/12* (2013.01); *G06F 9/445* (2013.01); *H04N 1/00965* (2013.01); *H04N 2201/0094* (2013.01)
 USPC .......................................... 717/175; 705/51

(58) Field of Classification Search
 USPC ........................................................ 717/169
 See application file for complete search history.

(56) References Cited

U.S. PATENT DOCUMENTS

| 5,930,513 | A | * | 7/1999 | Taylor | 717/174 |
| 2002/0156738 | A1 | * | 10/2002 | Irmler | 705/52 |
| 2004/0127196 | A1 | * | 7/2004 | Dabbish et al. | 455/411 |
| 2005/0076334 | A1 | * | 4/2005 | Demeyer | 717/177 |
| 2008/0244057 | A1 | * | 10/2008 | Kojima | 709/223 |
| 2010/0333214 | A1 | * | 12/2010 | Tsuboi | 726/29 |
| 2011/0145928 | A1 | * | 6/2011 | Tsuboi | 726/26 |

FOREIGN PATENT DOCUMENTS

JP 2004-355479 A 12/2004

OTHER PUBLICATIONS

Schmidt, Rainer, and Matthias Rella. "Application Integration and Provisioning." (2014), accessed online from <http://www.scape-project.eu>.*

* cited by examiner

*Primary Examiner* — James D Rutten
(74) *Attorney, Agent, or Firm* — Fitzpatrick, Cella, Harper & Scinto

(57) ABSTRACT

An image forming apparatus, which is configured to install application software that runs on an operation environment, comprises: a storage unit which stores a data file of system software, a data file of application software required to extend a function of the image forming apparatus, a license file required to install the application software, and a control file which defines a state after preinstall with respect to the application software; a preinstall unit which preinstalls application software stored in the storage unit using the license file upon activation of the image forming apparatus; and a changing unit which changes the preinstalled application software to a state defined by the control file.

12 Claims, 14 Drawing Sheets

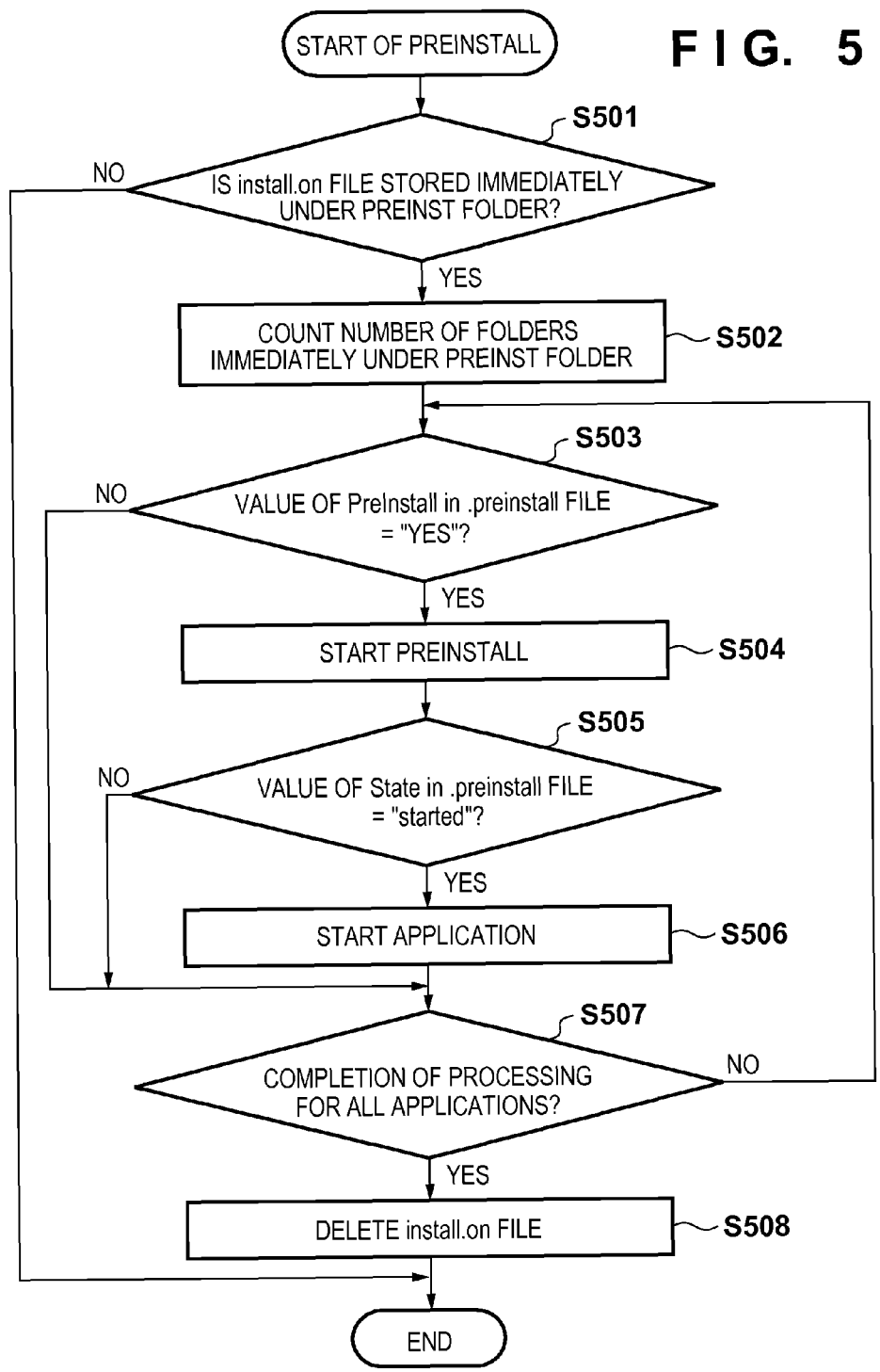

FIG. 6

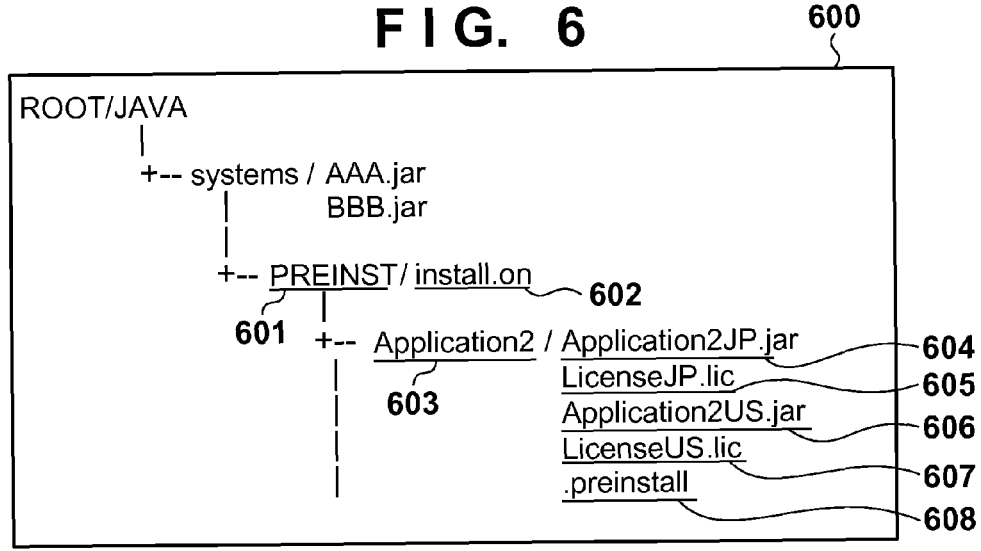

```
ROOT/JAVA
  |
  +-- systems / AAA.jar
  |           BBB.jar
  |
  +-- PREINST/ install.on  ~602
      601  |
           +-- Application2 / Application2JP.jar  ~604
                     603         LicenseJP.lic       ~605
                                 Application2US.jar ~606
                                 LicenseUS.lic      ~607
                                 .preinstall        ~608
```
600

FIG. 7

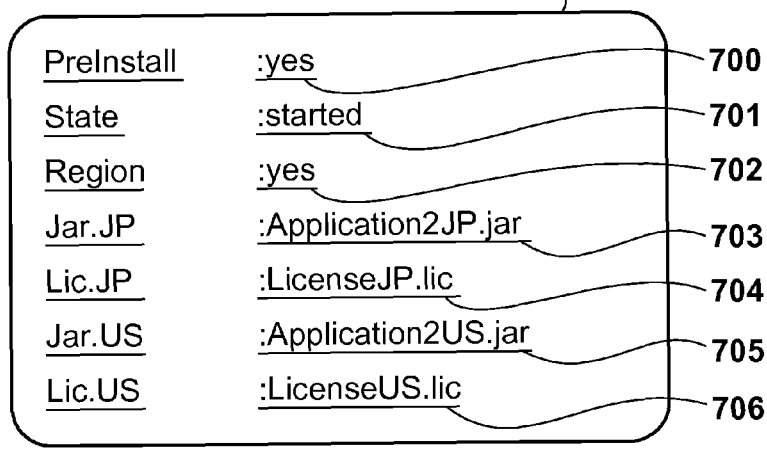

| PreInstall | :yes | ~700 |
| State | :started | ~701 |
| Region | :yes | ~702 |
| Jar.JP | :Application2JP.jar | ~703 |
| Lic.JP | :LicenseJP.lic | ~704 |
| Jar.US | :Application2US.jar | ~705 |
| Lic.US | :LicenseUS.lic | ~706 |

| JAPAN | JP |
|---|---|
| NORTH AMERICA | US |
| EUROPE | EU |
| CHINA | CN |
| KOREA | KR |
| TAIWAN | TW |
| AUSTRALIA | AU |

F I G. 14
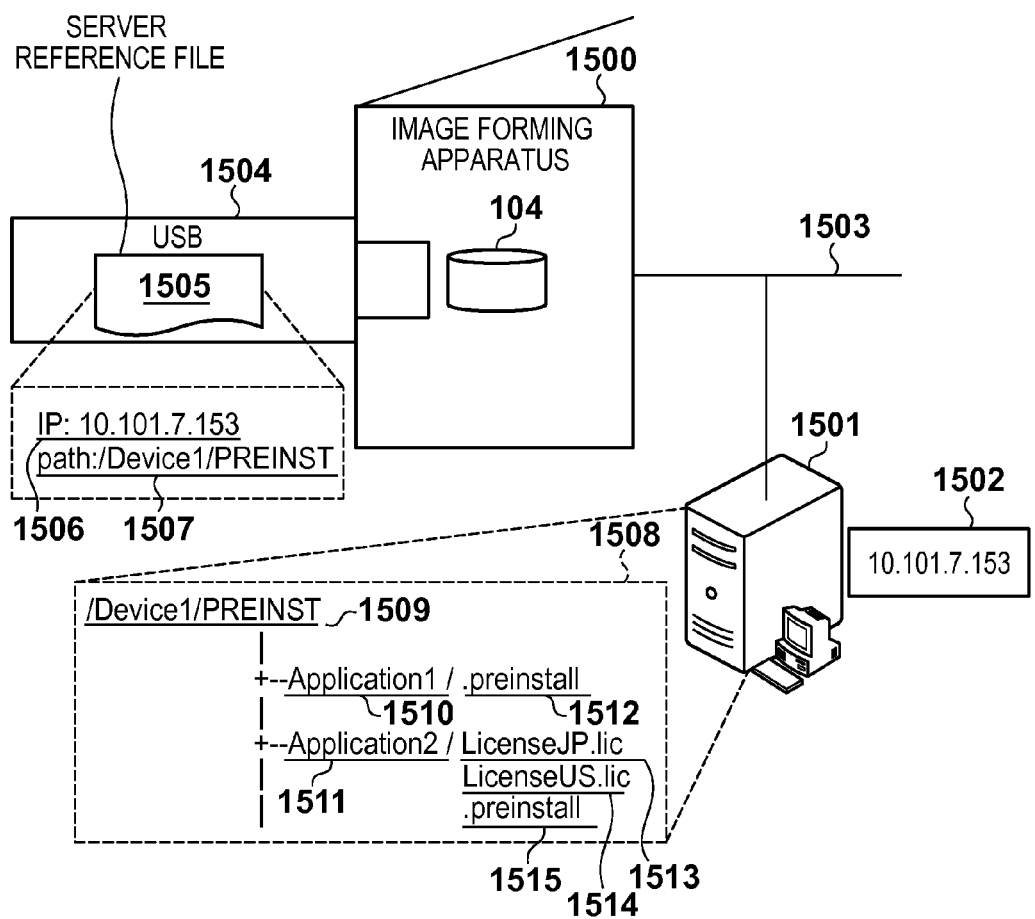

F I G. 18
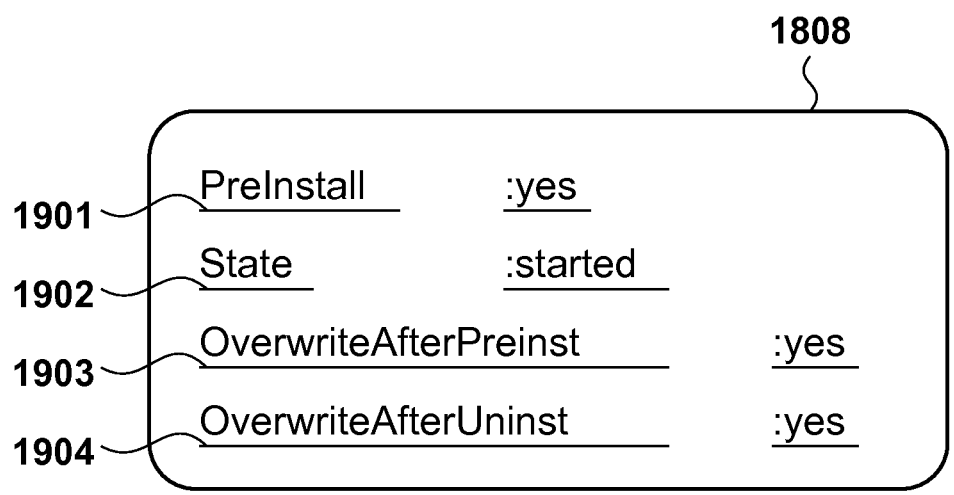

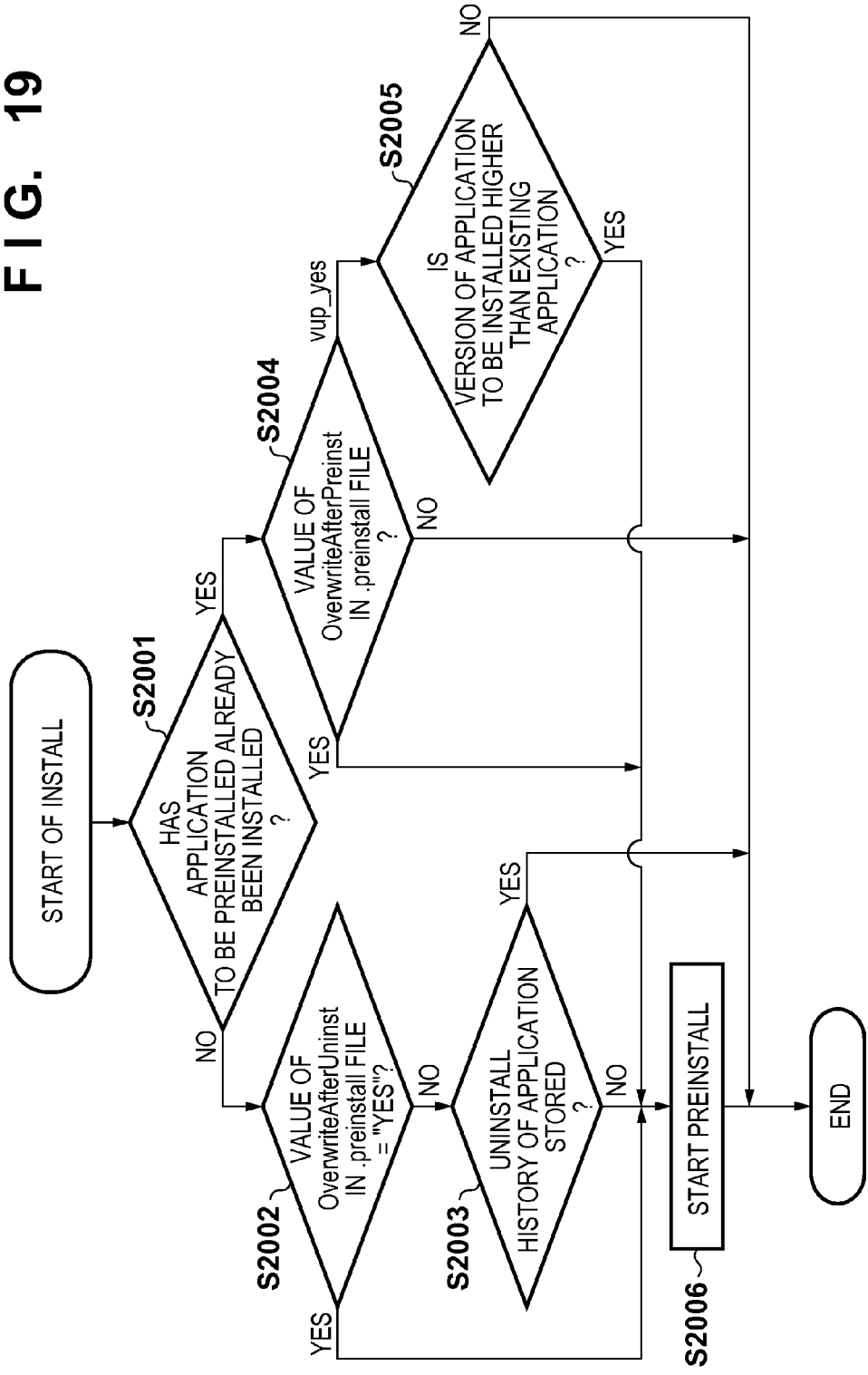

IMAGE FORMING APPARATUS, METHOD OF PREINSTALLING APPLICATION, AND NON-TRANSITORY COMPUTER-READABLE MEDIUM

BACKGROUND OF THE INVENTION

1. Field of the Invention

The present invention relates to an image forming apparatus, a method of pre-installing an application, and a non-transitory computer-readable medium.

2. Description of the Related Art

In recent years, an image forming apparatus provides an operation environment of an application program (to be simply referred to as "application" hereinafter) represented by a JAVA® environment. In order to improve functions and usability of an image forming apparatus, an application, which runs in an environment with high program portability such as a JAVA® environment, is created and installed, thereby implementing a desired function.

As a conventional method of installing an application in an image forming apparatus, a method of installing the application from a client terminal via a network is known. However, such install method requires pre-settings of the network, and imposes a heavy load on the user who wants to install the application. Thus, as an application install form, a preinstall form is known, that is, an application is incorporated in advance in an apparatus and is installed when the apparatus is activated (for example, see Japanese Patent Laid-Open No. 2004-355479).

Examples of applications to be installed in an image forming apparatus include two types of applications, that is, a system application (system software) and general application (application software). The system application and general application have the following difference. That is, the system application is provided as firmware of the image forming apparatus, and cannot be uninstalled. By contrast, the general application allows additional install and uninstall. Also, the general application requires a license required to run the application for the purpose of install. On the other hand, the system application is incorporated in advance in the image forming apparatus, and does not require any license.

Japanese Patent Laid-Open No. 2004-355479 is a technique related to system software which is executed while being incorporated in advance in the image forming apparatus. Therefore, unlike the system application, this technique cannot be used for the general application which can be installed later (problem 1).

As described above, install of the general application requires a license, and cannot be coped with by the conventional firmware configuration including the system application which does not require any license (problem 2).

The conventional method does not consider designation of states such as start and stop for the preinstalled general application (problem 3).

Furthermore, in order to change language resources and the like of an image forming apparatus for respective destination countries, an application to be preinstalled has to be changed depending on destination settings (regions). In this case, an application has to be preinstalled in consideration of a combination of the destination settings and application (problem 4).

SUMMARY OF THE INVENTION

The present invention realizes flexible operation control associated with preinstall of an application according to the use application by solving at least one of the aforementioned problems.

According to one aspect of the present invention, there is provided an image forming apparatus, which is configured to install application software that runs on an operation environment provided by the image forming apparatus, the apparatus comprising: a storage unit configured to store a data file of system software of the image forming apparatus, a data file of application software required to extend a function of the image forming apparatus, a license file required to install the application software, and a control file which defines a state after preinstall with respect to the application software; a preinstall unit configured to preinstall application software stored in the storage unit using the license file upon activation of the image forming apparatus; and a changing unit configured to change the preinstalled application software to a state defined by the control file, wherein the storage unit allocates a data file of the application software, a license file required to install the application software, and a control file corresponding to the application software in a directory different from a directory in which a data file of the system software is allocated.

According to another aspect of the present invention, there is provided a preinstall method in an image forming apparatus, which is configured to install application software that runs on an operation environment provided by the image forming apparatus, the image forming apparatus comprising: a storage unit configured to store a data file of system software of the image forming apparatus, a data file of application software required to extend a function of the image forming apparatus, a license file required to install the application software, and a control file which defines a state after preinstall with respect to the application software; a preinstall step of preinstalling application software stored in the storage unit using the license file upon activation of the image forming apparatus; and a changing step of changing the preinstalled application software to a state defined by the control file, wherein the storage unit allocates a data file of the application software, a license file required to install the application software, and a control file corresponding to the application software in a directory different from a directory in which a data file of the system software is allocated.

According to another aspect of the present invention, there is provided a non-transitory computer-readable medium storing a program for controlling a computer to function as: a storage unit configured to store a data file of system software of the computer, a data file of application software required to extend a function of the computer, a license file required to install the application software, and a control file which defines a state after preinstall with respect to the application software; a preinstall unit configured to preinstall application software stored in the storage unit using the license file upon activation of the computer; and a changing unit configured to change the preinstalled application software to a state defined by the control file, wherein the storage unit allocates a data file of the application software, a license file required to install the application software, and a control file corresponding to the application software in a directory different from a directory in which a data file of the system software is allocated.

According to the present invention, flexible operation control of preinstall of an application can be realized for an image forming apparatus according to use application.

Further features of the present invention will become apparent from the following description of exemplary embodiments (with reference to the attached drawings).

BRIEF DESCRIPTION OF THE DRAWINGS

FIG. 5 is a flowchart at the time of preinstall of an installer;

FIG. 6 is a view showing an example of the configuration of preinstall firmware according to the second embodiment;

FIG. 7 is a view showing an example of the contents of a .preinstall file;

FIG. 8 is a table showing an example of country-dependent codes;

FIG. 14 is a view showing an example of the file configuration according to the fourth embodiment;

FIG. 18 is a view showing an example of the contents of a .preinstall file; and

FIG. 19 is a flowchart showing preinstall processing at the time of .preinstall file extension of an installer.

DESCRIPTION OF THE EMBODIMENTS

Embodiments of the present invention will be described hereinafter with reference to the drawings. Note that in this specification, "preinstall" is one of install forms of an application, and is a form in which an application is incorporated in an apparatus in advance and is installed when the apparatus is activated for the first time.

Also, "system application" described in this specification indicates system software which is held in advance in a storage, and is preinstalled at the activation timing of the apparatus. The system application is held in advance as firmware in an image forming apparatus, and does not require any license when it is preinstalled. The system application provides a basic function of the image forming apparatus, and cannot be freely uninstalled by the user.

By contrast, "general application" indicates application software used to extend functions of the image forming apparatus. The general application can be additionally installed/uninstalled even after activation of the apparatus in accordance with a user instruction or the like. Assume that the general application requires a license when it is installed. Also, in this embodiment, assume that both of the system application and general application run on a JAVA operation environment provided by the image forming apparatus.

First Embodiment

This embodiment will explain an example in which when a general application is preinstalled, a state of the application is designated after preinstall. Note that the first embodiment is an example, which solves problems 1 to 3 above.

Figure 1:
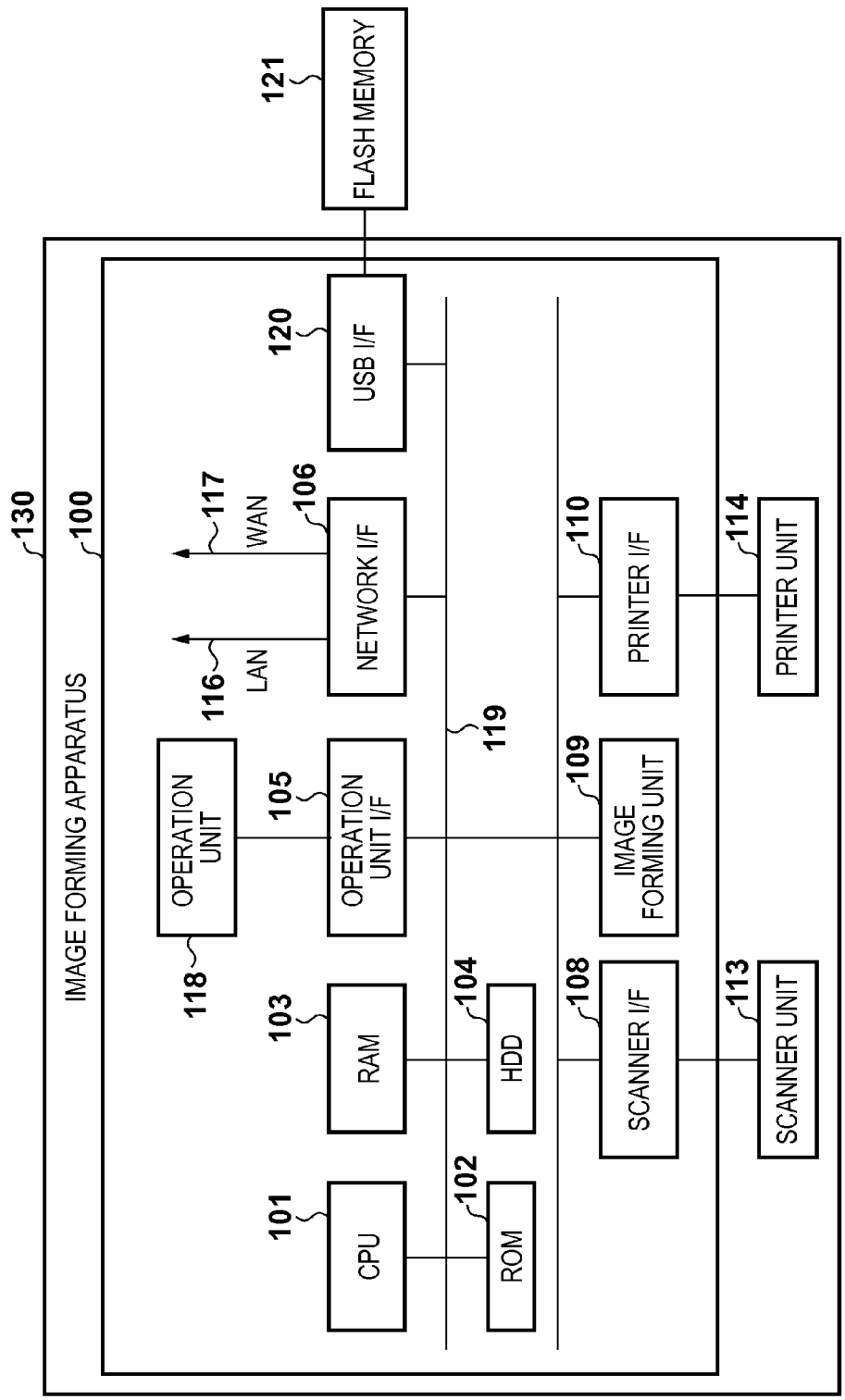
FIG. 1 is a block diagram showing an example of the hardware arrangement of an image forming apparatus.

FIG. 1 is a block diagram showing the hardware arrangement of an image forming apparatus 130 which includes a print function, scan function, network communication function, and the like. Referring to FIG. 1, a controller 100 is used as that of the image forming apparatus 130.

The controller 100 is electrically connected to a scanner unit 113 and printer unit 114, and also to an external apparatus via a LAN 116. Thus, image data and device information can be exchanged. A CPU 101 systematically controls accesses to various connected hardware components based on a control program and the like stored in a ROM 102, and also systematically controls various kinds of processing executed inside the controller. The ROM 102 is a read-only nonvolatile storage area, and stores a boot program and the like of the image forming apparatus 130.

A RAM 103 is a system work memory required for the CPU 101 to operate, and is a memory used to temporarily store various data. The RAM 103 includes an FRAM and SRAM which can hold stored contents even after power OFF, a DRAM storage contents of which are erased after power OFF, or the like. An HDD 104 is a nonvolatile storage area, and stores a system application, and the like. Firmware including an application to be preinstalled (to be described later with reference to FIG. 3) is stored in the HDD 104. Note that the firmware indicates a software group stored at the time of delivery of the image forming apparatus from a factory.

An operation unit I/F 105 is an interface unit which connects a system bus 119 and operation unit 118. More specifically, the operation unit I/F 105 receives data to be displayed on the operation unit 118 from the system bus 119 and displays that data on the operation unit 118. Also, the operation unit I/F 105 outputs input information from the operation unit 118 onto the system bus 119. A user information and information presentation with respect to the image forming apparatus 130 are made via the operation unit 118.

A network I/F 106 is connected to the LAN 116, a WAN 117, and the system bus 119 to exchange information with an external apparatus. A scanner I/F 108 corrects, processes, and edits image data received from the scanner unit 113. An image forming unit 109 executes direction conversion, image compression/decompression, and the like of image data. A printer I/F 110 receives image data output from the image forming unit 109, and controls the printer unit 114 to print that image data after image formation. A USB interface 120 is a versatile interface used to connect various peripheral devices to the image forming apparatus 130, and executes connection control to USB (Universal Serial Bus). In this embodiment, a flash memory 121 is connected to the USB interface 120.

[Software Module Hierarchy]

Figure 2:
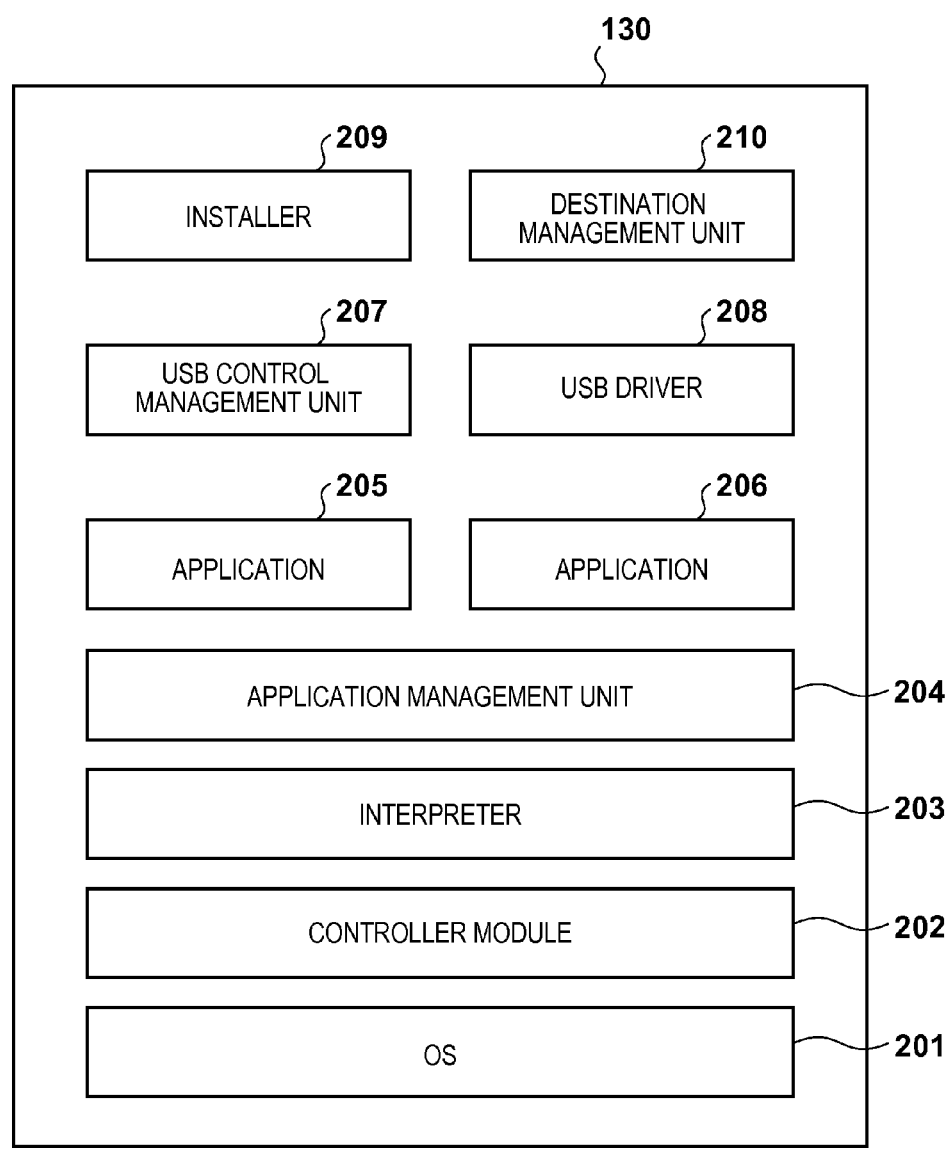
FIG. 2 is a view showing an example of the software module hierarchy of the image forming apparatus.

FIG. 2 shows the software module hierarchy of the image forming apparatus 130. Note that respective software modules shown in FIG. 2 are stored in the ROM 102 and are executed by the CPU 101. Various kinds of information used at the execution timing are held in the RAM 103 or HDD 104, and software functions exchange various kinds of information. Furthermore, a communication with an external apparatus is made using the network I/F 106.

Respective software modules will be described below. The software modules include an OS (Operating System) 201. The software modules include a controller module 202 required for various kinds of device control on the OS 201, and an interpreter 203 required to sequentially execute programs such as an application program on the controller module 202. The software modules include an application management unit 204 used to manage a plurality of application groups on the interpreter 203. Applications 205 and 206 used to implement various functions run under the management of the application management unit 204.

An application installer (to be referred to as "installer" hereinafter) 209 is a system application which executes install control of the applications 205 and 206. The application management unit 204 adds an application as a management target in response to an install instruction of the application by the installer 209. The application management unit 204 holds application information including a version of the application added under its management, license information, and the like. Furthermore, the application management unit 204 excludes the application 206 from the management target in response to deletion of the application program in the image forming apparatus 130.

The applications 205 and 206 provide various kinds of processing in the image forming apparatus 130 to the user. For example, image processing and compression application, an application used to execute department management such as a print limitation, and a login application used to manage login users, and the like are provided. When the flash memory 121 is connected to the image forming apparatus 130, the USB interface 120 recognizes connection of the flash memory 121, and notifies a USB control management unit 207 of that connection via a USB driver 208. The USB interface 120 is notified of contents of the flash memory 121 via the USB driver 208, and can grasp the contents. Note that this embodiment uses a USB memory as a portable medium connectable to the image forming apparatus, but it is not limited to such specific medium.

A destination management unit 210 manages destination information (region information) of the image forming apparatus 130. A destination of the image forming apparatus 130 is decided at the factory shipping timing, and is stored in the RAM 103. The destination information stored in the RAM 103 can be acquired via the destination management unit 210. The destination information indicates a country where the image forming apparatus to be shipped is used.

[Firmware Configuration]

Figure 3:
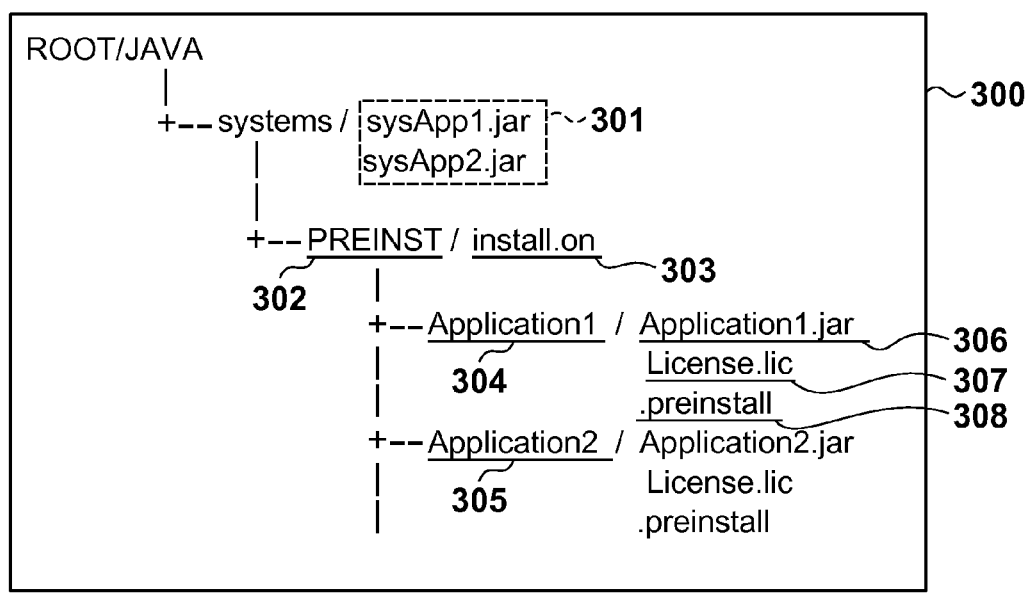
FIG. 3 is a view showing an example of the configuration of preinstall firmware according to the first embodiment.

FIG. 3 shows a configuration example 300 of firmware according to this embodiment, which includes applications to be preinstalled (to be referred to as preinstall applications hereinafter). Assume that this firmware is stored in the HDD 104. In the image forming apparatus according to this embodiment, applications 301 allocated immediately under a ROOT/JAVA/systems directory are system applications including the installer 209. In this embodiment, the applications 301 correspond sysApp1.jar and sysApp2.jar. That is, the applications 301 are those which can be installed without requiring any license.

In this embodiment, the firmware has a configuration below a PREINST directory. An install.on file 303 allocated immediately under a ROOT/JAVA/systems/PREINST directory 302 is a preinstall execution flag file. When the install.on file 303 is stored, that is, when the device is activated for the first time or when it is activated for the first time after the firmware is updated, the installer 209 executes preinstall. After execution of preinstall, the installer 209 deletes the install.on file 303. Thus, preinstall is not executed at the subsequent activation timings.

A ROOT/JAVA/systems/PREINST/Application) directory 304 is a storage directory of a preinstall application. Directories are assured for respective applications to be preinstalled. Therefore another preinstall application is allocated in a ROOT/JAVA/systems/PREINST/Application2 directory 305. FIG. 3 shows two applications (Application1 and Application2) to be handled as general applications.

Immediately under the Application1 directory 304, application data 306, a license file 307, and a preinstall designation file (to be referred to as a .preinstall file 308 hereinafter) of the application to be preinstalled are allocated. The license file 307 includes key information required to decode the encrypted application data 306, and license information (a validity date, an upper limit value of resources that can be used by the application, and the like). At the time of install using the application data 306, the installer 209 decrypts the application data 306 using the license file 307, stores the license information in the RAM 103, thereby installing the application. Note that an extension .jar for the application data 306 indicates a file format which combines and compresses Java application resources into one.

The .preinstall file 308 is data (control file) which defines information required to control install execution at the time of preinstall. The installer 209 executes install processing, as shown in the flowchart shown in FIG. 5, in accordance with description contents (FIG. 4) of the .preinstall file 308.

Figure 4:
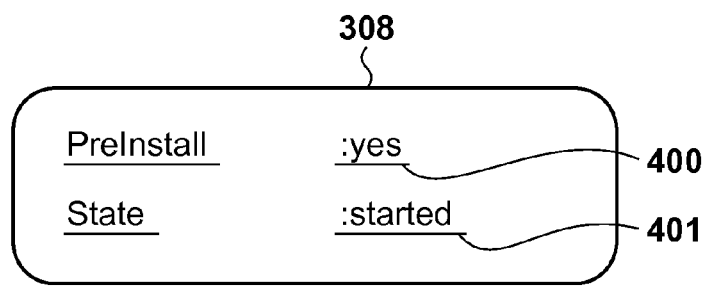
FIG. 4 is a view showing an example of the contents of a .preinstall file.

FIG. 4 shows the contents of the .preinstall file 308. The .preinstall file 308 includes tags and corresponding values. A PreInstall tag setting 400 indicates whether or not to execute preinstall. When a value of the PreInstall tag setting 400 is "yes", preinstall is executed; when it is "no", preinstall is not executed.

A State tag setting 401 designates whether or not to start an application after execution of preinstall of that application. When a value of the State tag setting 401 is "started", the application is started; when it is "stopped", only install of the application is executed without starting it. When the application is set in a start state, processing unique to that application is started and, for example, a button of that application is selectable on a main screen.

[Processing Sequence]

FIG. 5 is a flowchart showing the operation of the installer 209 at the time of preinstall. Preinstall may be started at the activation timing of the image forming apparatus 130. Alternatively, a preinstall execution confirmation screen may be displayed on the operation unit 118 of the image forming apparatus 130, and whether or not to start preinstall may be selected by the user. In this embodiment, assume that two preinstall applications are stored in the firmware, as shown in FIG. 3.

When the preinstall is started, the installer 209 confirms in step S501 whether or not the install.on file 303 is stored immediately under the PREINST directory 302. If the install.on file 303 is not stored (NO in step S501), the installer 209 does not execute the preinstall, and the sequence ends. If the install.on file 303 is stored (YES in step S501), the process advances to step S502.

In step S502, the installer 209 counts the number of preinstall application directories, and the process advances to step S503. In step S503, the installer 209 checks the value of the PreInstall tag setting 400 of the .preinstall file 308 in the Application) directory 304 as the first preinstall application directory. If the value of the PreInstall tag setting 400 is "yes" (YES in step S503), the process advances to step S504. If the value of the PreInstall tag setting 400 is "no" (NO in step S503), the process jumps to step S507 without preinstalling that application.

In step S504, the installer 209 preinstalls the application data 306 stored in the Application1 directory 304 using the license file 307, and the process advances to step S505. In step S505, the installer 209 checks the value of the State tag setting 401 of the .preinstall file 308 in the Application1 directory 304. If this value is "started" (YES in step S505), the process advances to step S506. On the other hand, if the value is "stopped" (NO in step S505), the process jumps to step S507. In step S506, the installer 209 changes the installed Application1 to a start state, and the process advances to step S507.

The installer 209 determines in step S507 whether or not the processing is complete for all the preinstall applications counted in step S502. If the processing is complete for all the applications (YES in step S507), the process advances to step S508. If the applications which are to undergo the preinstall processing still remain (NO in step S507), the next preinstall application is selected and the process returns to step S503, thus continuing the preinstall.

In step S508, the installer 209 deletes the install.on file 303. After completion of deletion, this processing sequence ends.

As described above, according to this embodiment, the general applications can be preinstalled while designating behaviors at the install timing.

Second Embodiment

This embodiment will describe an example in which different applications are installed for respective destination settings of an image forming apparatus 130 as another use example of a .preinstall file 308 described in the first embodiment. Note that the second embodiment can solve the problems 1 to 4 above. That is, this embodiment corresponds to a region.

FIG. 6 shows a configuration example 600 of firmware including preinstall applications stored in an HDD 104. An install.on file 602 stored immediately under a ROOT/JAVA/systems/PREINST directory 601 is a preinstall execution flag file.

A ROOT/JAVA/systems/PREINST/Application2 directory 603 is that which stores a preinstall application. Immediately under this directory, a plurality of data files corresponding to applications to be currently preinstalled are allocated. In this embodiment, Japan destination application data (Application2JP.jar) 604, a Japan destination license file (LicenseJP.lic) 605, North America destination application data (Application2US.jar) 606, a North America destination license file (LicenseUS.lic) 607, and a preinstall designation file (.preinstall) 608 are allocated.

The LicenseJP.lic file 605 is a license for the Application2JP.jar file 604, and the LicenseUS.lic file 607 is a license for the Application2US.jar file 606. An installer 209 uses the LicenseJP.lic file 605 when it installs the Application2JP.jar file 604. Also, the installer 209 uses the LicenseUS.lic file 607 when it installs the Application2US.jar file 606.

The .preinstall file 608 is a file which describes a control instruction at the time of preinstall. The installer 209 executes preinstall according to the contents described in the .preinstall file 608.

FIG. 7 is a view for explaining the contents of the .preinstall file 608. A PreInstall tag setting 700 and State tag setting 701 are the same as those in the first embodiment, and a description thereof will not be repeated. A Region tag setting 702 is a designation to change an application to be preinstalled according to a destination setting of the image forming apparatus 130. When a value of the Region tag setting 702 is "yes", an application is installed according to the following Jar.XX tag and Lic.XX tag (XX is a country code for each destination). When a value of the Region tag setting 702 is "no", an application stored immediately under the directory described in the first embodiment is searched for, and is preinstalled. FIG. 8 shows an example of country codes. Note that the configuration of codes indicating respective countries is not limited that shown in FIG. 8, and other structures may be used.

A Jar.JP tag setting 703 indicates an application to be installed in correspondence with the Japan destination. Also, a Lic.JP tag setting 704 indicates a license to be used for the Japan destination application.

Likewise, a Jar.US tag setting 705 indicates an application to be installed in correspondence with the North America destination. Also, a Lic.US tag setting 706 indicates a license to be used for the North America destination application.

[Processing Sequence]

Figure 9:
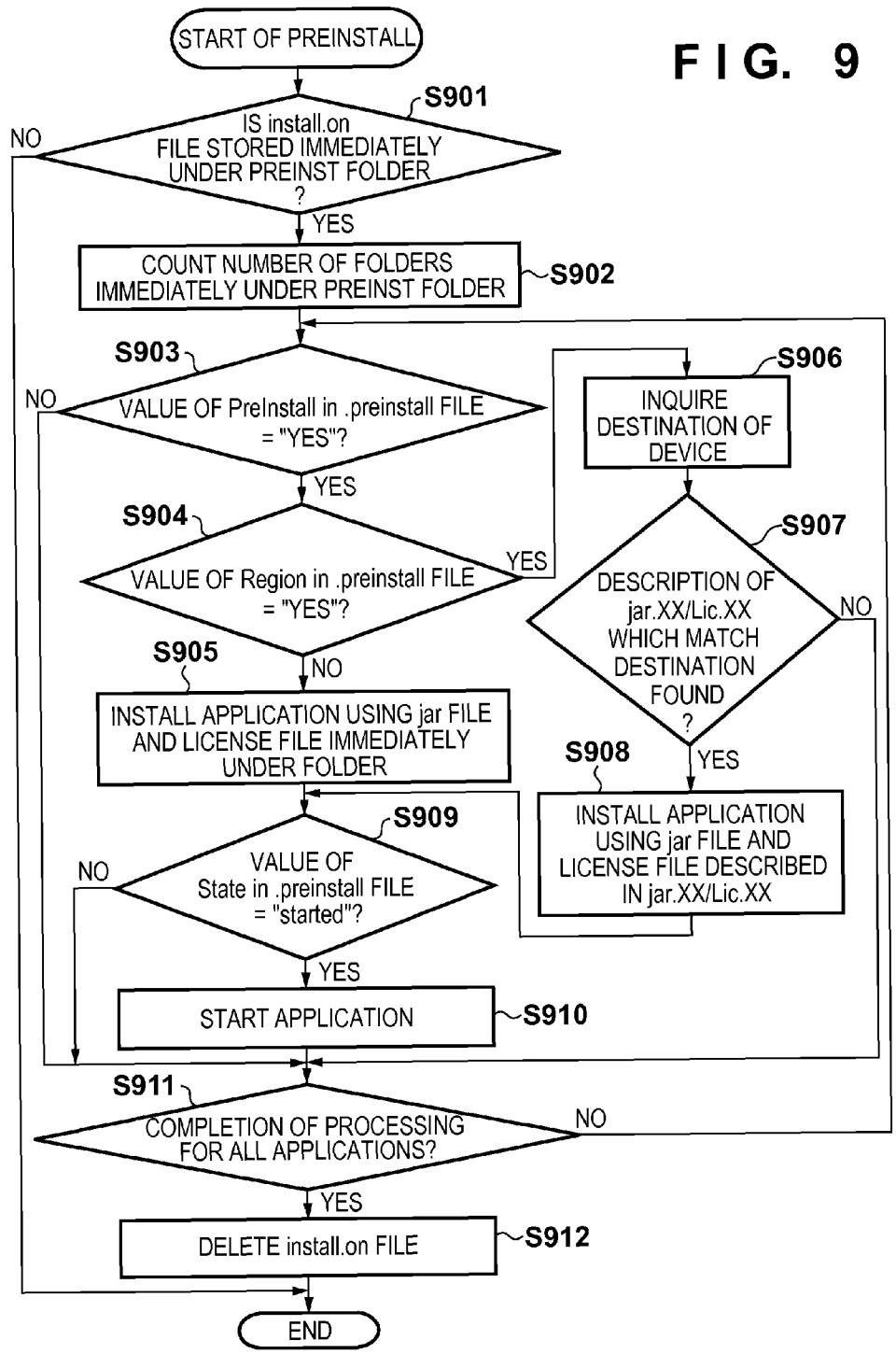
FIG. 9 is a flowchart at the time of preinstall of an installer.

FIG. 9 is a flowchart showing the operation of the installer 209 at the time of preinstall according to the second embodiment. Note that steps S901 and S902 are the same as steps S501 and S502 in FIG. 5, and a description thereof will not be repeated.

In step S903, the installer 209 checks the value of the PreInstall tag setting 700 of the .preinstall file 608 in the Application2 directory 603 as the first preinstall application directory. If this value is "yes" (YES in step S903), the process advances to step S904; if this value is "no" (NO in step S903), the process jumps to step S911.

In step S904, the installer 209 checks the value of the Region tag setting 702 of the .preinstall file 608. If the value is "no" (NO in step S904), the process advances to step S905; if the value is "yes" (YES in step S904), the process advances to step S906.

In step S905, the installer 209 searches for an application immediately under the preinstall application directory, and installs a found application, as described in the first embodiment. After that, the process advances to step S909.

In step S906, the installer 209 inquires a destination management unit 210 of destination information of the image forming apparatus 130. The installer 209 checks in step S907 whether or not a Jar.XX/Lic.XX (XX is a destination country code), which match the destination information acquired from the destination management unit 210 in step S906, are included in the .preinstall file 608. If the matched files are included (YES in step S907), the process advances to step S908; otherwise (NO in step S907), the process jumps to step S911.

In step S908, the installer 209 installs an application according to the information checked in step S907. For example, assume that a Japan country code is "JP" from FIG. 8. If the destination information designates Japan, the installer 209 installs the Application2JP.jar data as the value of the Jar.JP tag using the LicenseJP.lic license as the value of the Lic.JP tag setting. After that, the process advances to step S909.

Note that steps S909 to S912 are the same as steps S505 to S508 of FIG. 5 in the first embodiment, and a description thereof will not be repeated.

As described above, according to the second embodiment, a different application to be installed can be preinstalled for the destination of the image forming apparatus.

Third Embodiment

The third embodiment will describe an example in which applications are preinstalled while easily changing behaviors and licenses at the time of preinstall in correspondence with individual circumstances such as business negotiation contents or situations of an installation destination. More specifically, the following preinstall control can be used.
(1) Application1 is inhibited from being preinstalled.
(2) Application2 is preinstalled and set in a stop state.

(3) Application2 for North America destination is installed in place of that for Japan destination.
(4) Application2 is installed using a time-limited license in place of a normal indefinite license.

In order to meet these requirements in the example described in the first or second embodiment, another firmware in which a .preinstall file is replaced has to be prepared. The third embodiment will describe an example using a USB 1001 so as to meet the requirements (1) to (4).

[System Arrangement]

Figure 10:
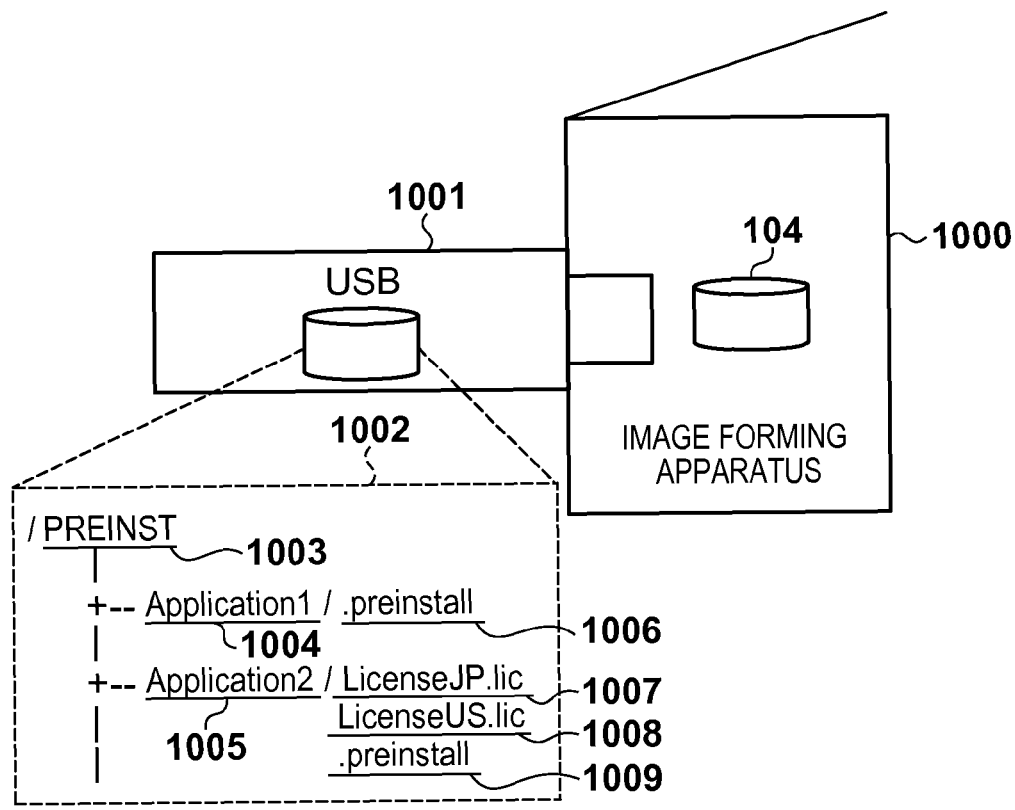
FIG. 10 is a block diagram showing an example of the configuration of preinstall firmware according to the third embodiment.
Figure 11:
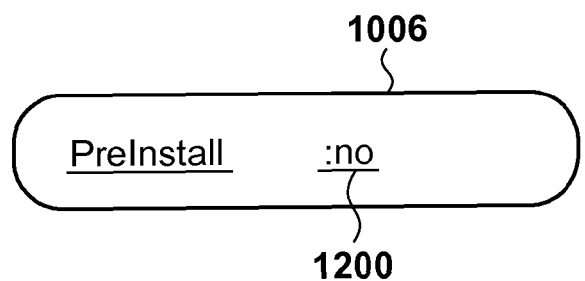
FIG. 11 is a view showing an example of the contents of a .preinstall file.

FIG. 10 is a block diagram for explaining this embodiment. A system shown in FIG. 10 includes an image forming apparatus 1000 and USB 1001. Note that a configuration example of firmware, which is stored in an HDD 104 in the image forming apparatus 1000 and includes preinstall applications, includes an Application1 directory shown in FIG. 3 and an Application2 directory shown in FIG. 6. Contents 1002 stored in the USB 1001 will be described below. A PREINST directory 1003 is assured at a root position. An Application1 directory 1004 and Application2 directory 1005 are allocated immediately under the PREINST directory 1003. Furthermore, a .preinstall file 1006 is stored immediately under the Application1 directory 1004. FIG. 11 shows the contents of the .preinstall file 1006. FIG. 11 shows an example in which "no" is designated as a value of a PreInstall tag setting 1200.

Figure 12:
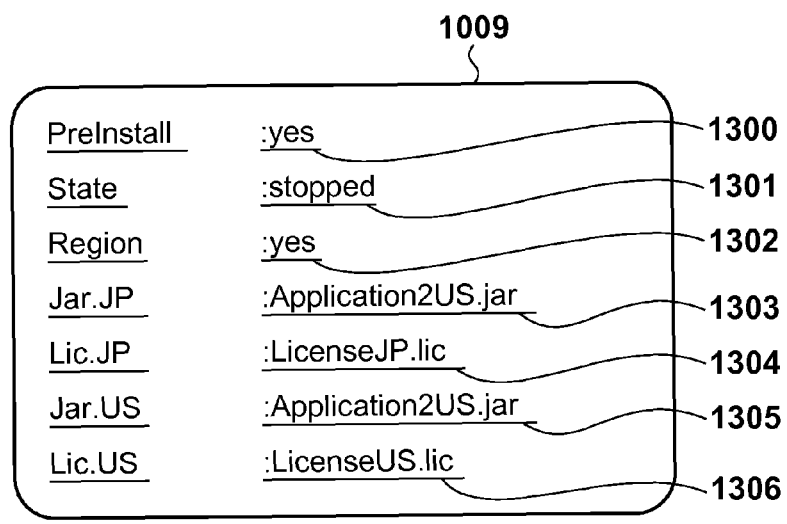
FIG. 12 is a view showing an example of the contents of a .preinstall file.

Next, immediately under the Application2 directory 1005, a license file 1007 (LicenseJP.lic), license file 1008 (LicenseUS.lic), and .preinstall file 1009 are stored. FIG. 12 shows the contents of the .preinstall file 1009 as a control file. In this example, "stopped" is designated as a value of a State tag setting 1301, and a Jar.JP tag setting 1304 designates Application2US.jar.

[Processing Sequence]

Figure 13:
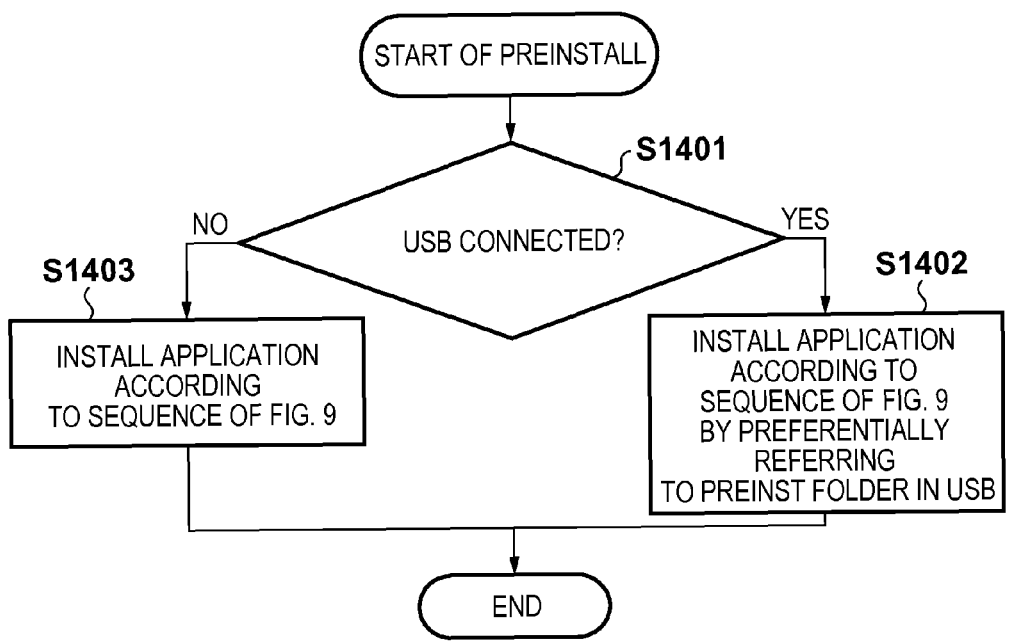
FIG. 13 is a flowchart showing preinstall processing at the time of USB connection of an installer.

FIG. 13 is a flowchart showing the operation of an installer 209 when the USB 1001 is connected to the image forming apparatus 1000. In step S1401, the installer 209 inquires a USB driver 208 as to whether or not the USB 1001 is connected. If the USB 1001 is not connected (NO in step S1401), the process advances to step S1403, and the installer 209 preinstalls an application according to the sequence shown in FIG. 9.

On the other hand, if the USB 1001 is connected (YES in step S1401), the process advances to step S1402. In step S1402, the installer 209 inquires the USB driver 208 as to whether or not a .preinstall file and license file are stored in the PREINST directory in the USB 1001. If these files are stored, the installer 209 executes preinstall according to the sequence shown in FIG. 9 using these files in the USB 1001 in place of those in the image forming apparatus 1000.

The install processing of Application1 and Application2 when the USB 1001 is connected will be described in detail below. When the USB 1001 is connected, the installer 209 preferentially refers to a value of a value of the PreInstall tag setting 1200 of the .preinstall file 1006 in the USB 1001 in place of a .preinstall file 308. Since the value of the PreInstall tag setting 1200 is "no", preinstall of Application1 is not executed. Thus, the aforementioned requirement (1) can be met.

Likewise, as for Application2, the installer 209 refers to the license file 1007, license file 1008, and .preinstall file 1009 stored in the USB 1001. Since a value of the State tag setting 1301 in the .preinstall file 1009 stored in the USB 1001 is "stopped", Application2 is not started after install. Thus, the aforementioned requirement (2) can be met.

Also, a value of the Jar.Jp tag setting 1303 of the .preinstall file 1009 in the USB 1001 is Application2US.jar. For this reason, when the destination setting of the image forming apparatus 1000 is Japan, Application2US.jar is installed. Thus, the aforementioned requirement (3) can be met.

Furthermore, a license term of the license file 1007 is set to be that of a time-limited license. As a result, since the installer 209 installs the application using the license file 1007, the time-limited license can be used. Thus, the aforementioned requirement (4) can be met.

As described above, according to the third embodiment, behaviors at the time of preinstall can be easily changed at the convenience of each user.

Fourth Embodiment

In the fourth embodiment, a file required to refer to a server (to be referred to as a server reference file) is allocated in a USB as another embodiment of the third embodiment. Since the server reference file is allocated, a preinstall option designation file in a designated server 1501 can be preferentially referred to, and behaviors at the time of preinstall can be changed according to individual circumstances. This embodiment will be described in detail below.

FIG. 14 is a block diagram of the fourth embodiment. A system of this embodiment includes an image forming apparatus 1500, server 1501, and USB 1504.

Figure 15:
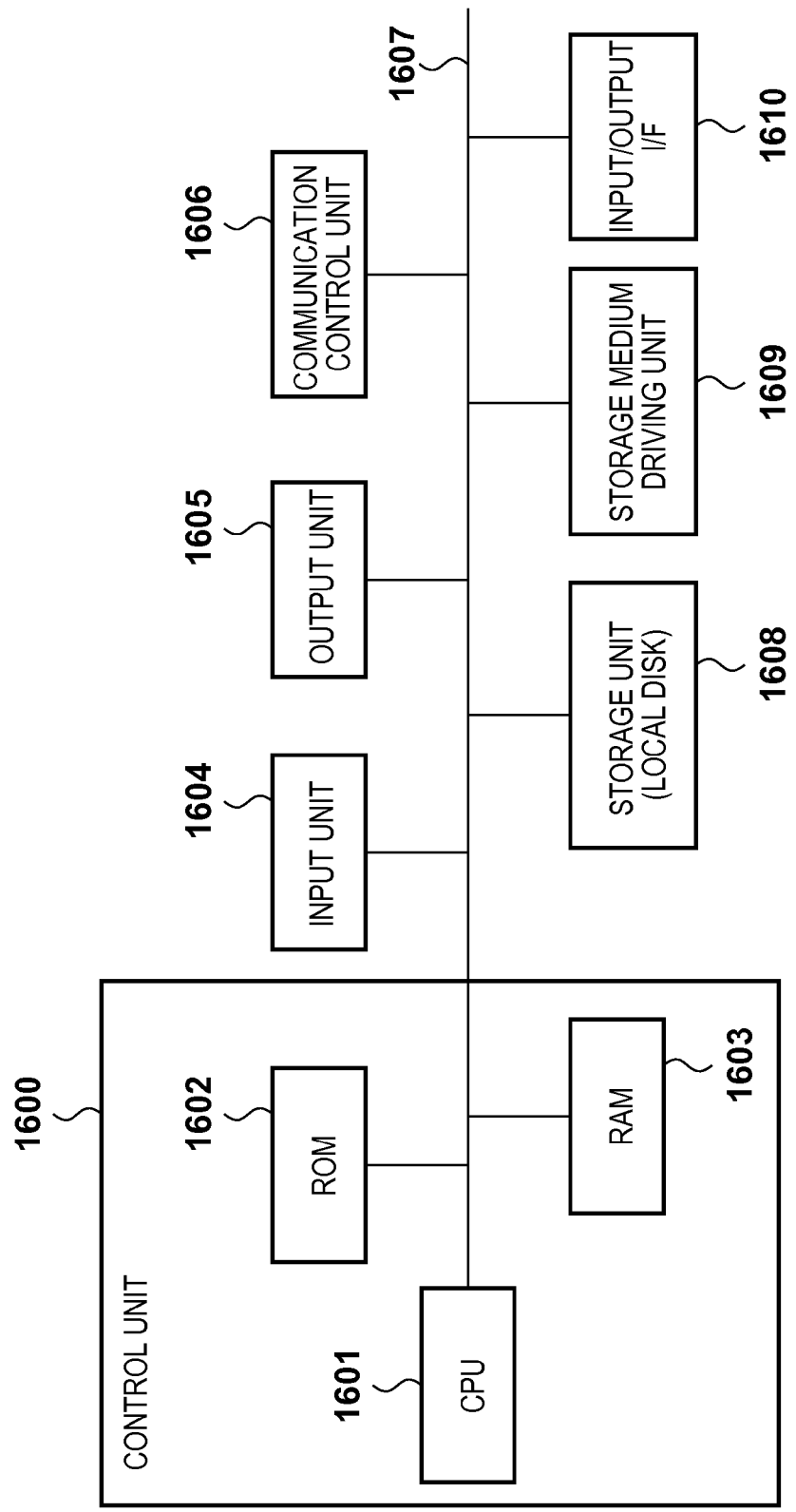
FIG. 15 is a block diagram showing an example of the hardware arrangement of a server.

FIG. 15 is a block diagram showing the hardware arrangement of the server 1501. Since the server 1501 of this embodiment is implemented on a PC (Personal Computer), the same arrangement as that of a general-purpose computer can be used. In the server 1501, a control unit 1600 is connected to an input unit 1604, output unit 1605, communication control unit 1606, storage unit 1608, storage medium driving unit 1609, and input/output interface 1610 via a bus line 1607.

Data signals, control signals, and the like are exchanged between the control unit 1600 and other components via the bus line 1607. The control unit 1600 includes a CPU 1601, ROM 1602, and RAM 1603.

The CPU 1601 executes various calculations, information processing, and overall control of the server 1501 according to predetermined programs. The ROM 1602 is a read-only storage device which stores various programs, data, parameters, and the like, which are required for the CPU 1601 to execute various calculations and control. The programs, data, parameters, and the like stored in the ROM 1602 can be read out, but they cannot be rewritten or erased. The RAM 1603 is a randomly accessible storage medium used as a working memory of the CPU 1601. Programs, data, and the like can be written in or erased from the RAM 1603.

The input unit 1604 includes, for example, input devices such as a keyboard and mouse. The output unit 1605 includes, for example, a display device and printer. The communication control unit 1606 establishes and maintains a communication with the image forming apparatus 1500. The storage unit 1608 includes a read/write-accessible storage medium and a driving device required to read out and write programs and data from and in that storage medium. Various programs, an OS (Operating System) as basic software required for the server 1501 to operate, and the like are stored in the storage unit 1608. The storage medium driving unit 1609 is a driving device which drives a detachable storage medium to read out and write data from and in the storage medium. For example, a magnetooptical disk, magnetic disk, magnetic tape, semiconductor memory, CD-ROM, and the like are used as target media.

The description will revert to that of the arrangement shown in FIG. 14. In this example, assume that an IP address "10.101.7.153" is assigned to the server 1501, as indicated by an IP address 1502. Note that the server may be accessed using another location information in place of the IP address.

The configuration of firmware 1508 for the image forming apparatus 1500, which firmware is stored in the storage unit 1608 of the server 1501, will be described below. Immediately under a Device1/PREINST directory 1509, an Application1 directory 1510 and Application2 directory 1511 are allocated. Immediately under the Application1 directory 1510, a .preinstall file 1512 is allocated. Note that the contents of the .preinstall file 1512 are the same as those shown in FIG. 11 described in the third embodiment.

On the other hand, immediately under the Application2 directory 1511, a license file 1513 (LicenseJP.lic), license file 1514 (LicenseUS.lic), and .preinstall file 1515 are stored. Assume that the contents of the .preinstall file 1515 as a control file are the same as those shown in FIG. 12 described in the third embodiment.

Also, the USB 1504 stores a server reference file 1505. Furthermore, the server reference file 1505 stores an IP address 1506 ("10.101.7.153") of the server 1501 to be referred to, and a path 1507 ("/Device1/PREINST/") to be referred to in the server 1501.

[Processing Sequence]

Figure 16:
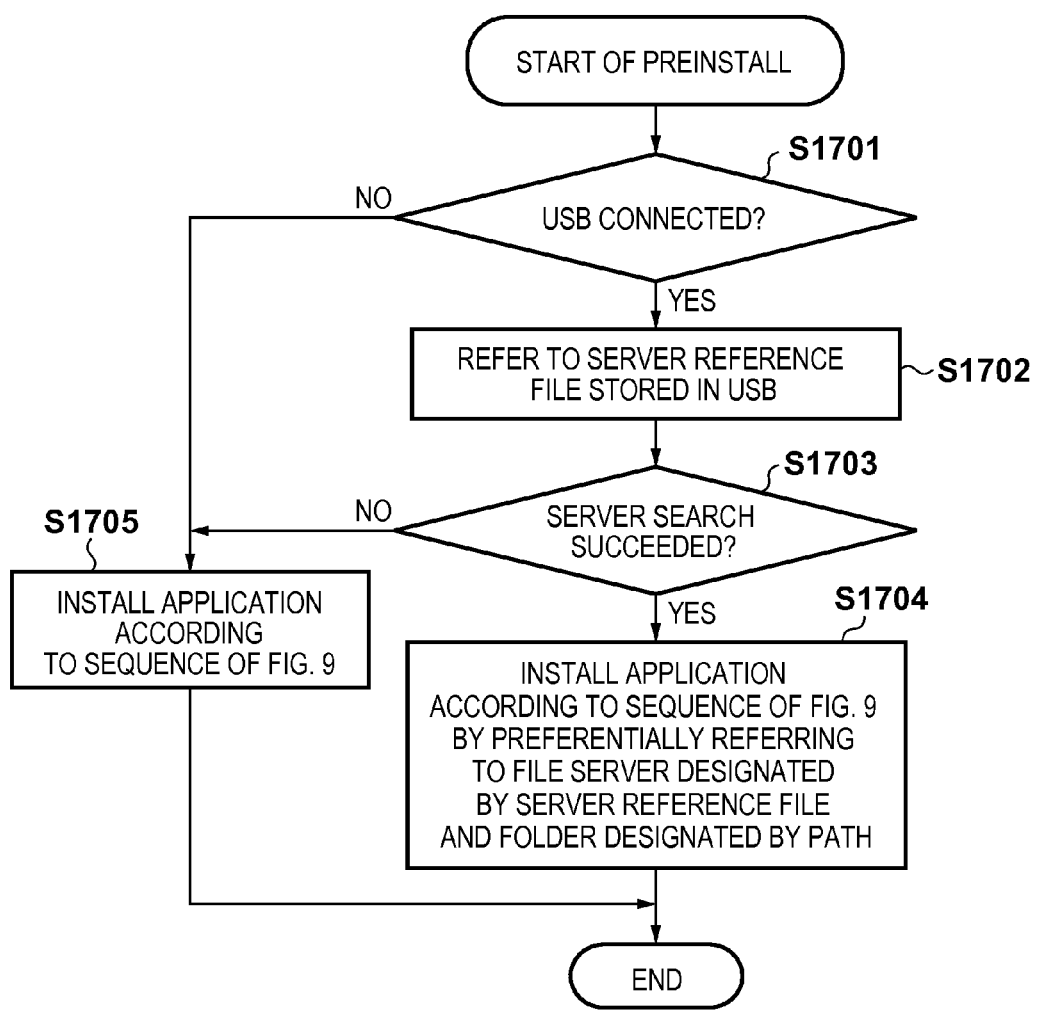
FIG. 16 is a flowchart showing preinstall processing at the time of USB connection of an installer.

FIG. 16 is a flowchart showing the operation of an installer 209 when the USB 1504 is connected to the image forming apparatus 1500 in this embodiment.

In step S1701, the installer 209 inquires the USB driver 208 as to whether or not the USB is connected. If the USB is not connected (NO in step S1701), the process advances to step S1705, and the installer 209 executes the processing sequence shown in FIG. 9 described in the second embodiment. If the USB is connected (YES in step S1701), the process advances to step S1702.

In step S1702, the installer 209 acquires the IP address 1506 described in the server reference file 1505 in the USB 1504, and the process advances to step S1703. In step S1703, the installer 209 searches for the server 1501 corresponding to the IP address 1506. If the search has failed (NO in step S1703), the process advances to step S1705; if the search has succeeded (YES in step S1703), the process advances to step S1704.

In step S1704, the installer 209 refers to the .preinstall file 1512, license file 1513, license file 1514, and .preinstall file 1515 in the server 1501. Since the subsequent processes are the same as those described in the third embodiment, a description thereof will not be repeated.

As described above, according to the fourth embodiment, since the USB 1504 stores information of the server to be referred to, behaviors at the time of preinstall for each user can be changed by the server. Also, setting contents can be simultaneously managed on the server.

Fifth Embodiment

Figure 17:
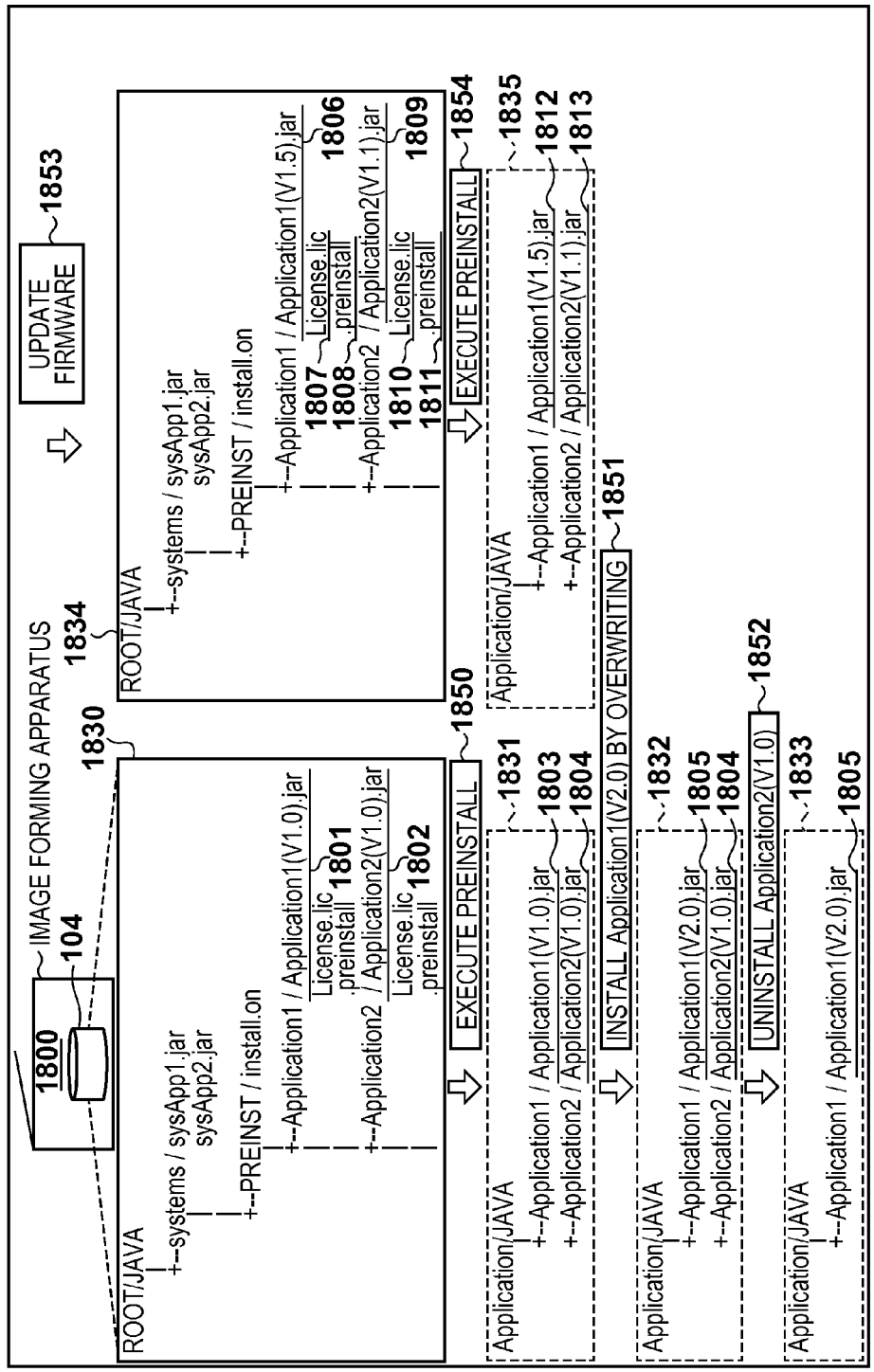
FIG. 17 is a view showing an example of the configuration of preinstall firmware and a state of an installed application.

The fifth embodiment relates to update processing of firmware corresponding to preinstall. FIG. 17 shows changes in conventional install state. An image forming apparatus 1800 holds firmware 1830 in an HDD 104. The firmware 1830 holds, as preinstall applications, Application1(V1.0) 1801 and Application2(V1.0) 1802. In the following description, a numerical value in parentheses indicates a version of an application.

At an initial activation timing 1850, an installer 209 executes preinstall. As a result, Application1(V1.0) 1803 and Application2(V1.0) 1804 are installed, as shown in an install state 1831. Next, the installer 209 installs Application1(V2.0) by overwriting in accordance with a user instruction at a timing 1851. As a result, Application1(V2.0) 1805 and Application2(V1.0) 1804 are installed, as shown in an install state 1832. Furthermore, the installer 209 uninstalls Application2(V1.0) 1804 in accordance with a user instruction at a timing 1852. As a result, only Application1(V2.0) 1805 is installed, as shown in an install state 1833.

Next, the installer 209 updates firmware at a timing 1853. The firmware may be updated automatically or manually. Note that firmware 1834 holds, as preinstall applications, Application(V1.5) 1806 and Application2(V1.1) 1808. In this case, at an initial activation timing 1854, the installer 209 executes preinstall. As a result, Application(V1.5) 1812 and Application2(V1.1) 1813 are installed, as shown in an install state 1835.

After the aforementioned processes, the installed Application1(V2.0) 1805 that the user desires is downgraded. Also, the previously uninstalled Application2(V1.0) 1804 is installed again.

A designation method for avoiding such state by extending .preinstall files 1808 and 1811 in FIG. 17, as shown in FIG. 18, will be described below. A PreInstall tag setting 1901 and State tag setting 1902 are the same as the PreInstall tag setting 400 and State tag setting 401 in FIG. 4 described in the first embodiment, and a description thereof will not be repeated.

An OverwriteAfterPreinst tag setting 1903 as a feature of this embodiment will be described below. When a value of the OverwriteAfterPreinst tag setting 1903 is "yes", it serves as a control instruction which permits all overwrite installs. When a value of the OverwriteAfterPreinst tag setting 1903 is "vup_yes", it serves as a control instruction which permits overwrite install only when an application is upgraded. When a value of the OverwriteAfterPreinst tag setting 1903 is "no", it serves as a control instruction which does not permit any overwrite install.

Next, an OverwriteAfterUninst tag setting 1904 as a feature of this embodiment will be described below. When a value of the OverwriteAfterUninst tag setting 1904 is "yes", it serves as a control instruction which permits overwrite install of even an application, which was uninstalled once. When a value of the OverwriteAfterUninst tag setting 1904 is "no", it serves as a control instruction which inhibits overwrite install of an application which was uninstalled once.

The OverwriteAfterPreinst tag setting 1903 and OverwriteAfterUninst tag setting 1904 implement update control information.

[Processing Sequence]

FIG. 19 is a flowchart showing the operation of the installer 209 which determines the OverwriteAfterPreinst tag and OverwriteAfterUninst tag at the time of preinstall.

The installer 209 determines in step S2001 whether or not a preinstall application to be installed has already been installed in the image forming apparatus 1800. If the application has not been installed yet (NO in step S2001), the process advances to step S2002; if the application has already been installed (YES in step S2001), the process advances to step S2004.

In step S2002, the installer 209 checks the value of the OverwriteAfterUninst tag setting 1904 in the .preinstall file. If the value of the OverwriteAfterUninst tag setting 1904 is "yes" (YES in step S2002), the process jumps to step S2006, and the installer 209 installs that application. If the value of the OverwriteAfterUninst tag setting 1904 is "no" (NO in step S2002), the process advances to step S2003.

The installer 209 checks in step S2003 whether or not the an uninstall history of the target application is stored. Assume that the uninstall history of the application is stored in a RAM 103 or the HDD 104 as history information. This implements a history information holding unit.

If the corresponding history is not stored (NO in step S2003), the process advances to step S2006, and the installer 209 starts install of that application. If the history is stored (YES in step S2003), this processing sequence ends.

In step S2004, the installer 209 checks the value of the OverwriteAfterPreinst tag setting 1903 in the .preinstall file. If the value of the OverwriteAfterPreinst tag setting 1903 is "yes", the process advances to step S2006, and the installer 209 installs that application. If the value of the OverwriteAfterPreinst tag setting 1903 is "no", this processing sequence ends. If the value of the OverwriteAfterPreinst tag setting 1903 is "vup_yes", the process advances to step S2005.

In step S2005, the installer 209 compares the version of the application to be installed with that of the existing application. The version of the existing application is managed by an application management unit 204. For this reason, the installer 209 inquires the application management unit 204 of the version of the existing application. If the version of the application to be installed is higher than that of the existing application (YES in step S2005), the process advances to step S2006, and the installer 209 installs that application. Otherwise (NO in step S2005), this processing sequence ends.

As described above, according to the fifth embodiment, the application which was uninstalled once can be prevented from being installed again, or the application can be prevented from being downgraded unwantedly.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-205035, filed Sep. 18, 2012, which is hereby incorporated by reference herein in its entirety.

What is claimed is:

1. An image forming apparatus, which is configured to install application software that runs on an operation environment provided by said image forming apparatus, said apparatus comprising:
   a storage unit configured to store a data file of system software of said image forming apparatus, a data file of application software required to extend a function of said image forming apparatus, a license file required to install the application software, and a control file which defines a state after preinstall with respect to the application software;
   a preinstall unit configured to preinstall application software stored in said storage unit using the license file upon activation of said image forming apparatus; and
   a changing unit configured to change the preinstalled application software to a state defined by the control file,
   wherein said storage unit allocates a data file of the application software, a license file required to install the application software, and a control file corresponding to the application software in a directory different from a directory in which a data file of the system software is allocated.

2. The apparatus according to claim 1, wherein said storage unit stores a flag file indicating whether or not to preinstall the application software in the directory in which the application software is allocated, and
   said preinstall unit preinstalls the application software when the flag file is stored.

3. The apparatus according to claim 2, wherein said storage unit deletes the flag file after completion of the preinstall by said preinstall unit.

4. The apparatus according to claim 1, wherein said storage unit configures application software-dependent directories in a directory in which application software is allocated, and stores a data file, a license file, and a control file of each application software in the corresponding directory.

5. The apparatus according to claim 1, further comprising an inquiry unit configured to inquire region information of said image forming apparatus,
   wherein the application software includes a plurality of data files and a plurality of license files corresponding to a plurality of regions, and
   said preinstall unit preinstalls using the data file and the license file of application software corresponding to region information acquired by said inquiry unit.

6. The apparatus according to claim 1, further comprising a determination unit configured to determine whether or not a portable medium which stores a license file or a control file for application software is connected to said image forming apparatus,
   wherein when the portable medium is connected, said preinstall unit preinstalls preferentially using the license file or the control file stored in the portable medium.

7. The apparatus according to claim 1, further comprising:
   a determination unit configured to determine whether or not a portable medium, which stores location information of an external apparatus that holds at least one of a data file, a license file, and a control file of application software, is connected to said image forming apparatus; and
   an acquisition unit configured to acquire at least one of the data file, the license file, and the control file of the application software from the external apparatus,
   wherein when the portable medium is connected, said acquisition unit acquires at least one of the data file, the license file, and the control file of the application software from the external apparatus based on the location information, and
   said preinstall unit preinstalls using at least one of the data file, the license file, and the control file of the application software acquired by said acquisition unit.

8. The apparatus according to claim 1, further comprising a history information holding unit configured to hold history information of an install history and an uninstall history of application software,
   wherein said preinstall unit does not preinstall application software which was uninstalled previously based on the history information.

9. The apparatus according to claim 1, wherein the control file includes update control information which defines whether or not to permit upgrading of already installed application software, and said preinstall unit installs the application software based on the update control information.

10. The apparatus according to claim 1, wherein the control file defines designation as to whether or not to preinstall corresponding application software, and at least one of a data file and a license file of an application used at a preinstall timing.

11. A preinstall method in an image forming apparatus, which is configured to install application software that runs on an operation environment provided by the image forming apparatus, the image forming apparatus comprising:
a storage unit configured to store a data file of system software of the image forming apparatus, a data file of application software required to extend a function of the image forming apparatus, a license file required to install the application software, and a control file which defines a state after preinstall with respect to the application software;

a preinstall step of preinstalling application software stored in the storage unit using the license file upon activation of the image forming apparatus; and a changing step of changing the preinstalled application software to a state defined by the control file, wherein the storage unit allocates a data file of the application software, a license file required to install the application software, and a control file corresponding to the application software in a directory different from a directory in which a data file of the system software is allocated.

12. A non-transitory computer-readable medium storing a program for controlling a computer to function as:
a storage unit configured to store a data file of system software of the computer, a data file of application software required to extend a function of the computer, a license file required to install the application software, and a control file which defines a state after preinstall with respect to the application software;

a preinstall unit configured to preinstall application software stored in said storage unit using the license file upon activation of the computer; and a changing unit configured to change the preinstalled application software to a state defined by the control file, wherein said storage unit allocates a data file of the application software, a license file required to install the application software, and a control file corresponding to the application software in a directory different from a directory in which a data file of the system software is allocated.

* * * * *